US010956988B2

(12) United States Patent
Beale

(10) Patent No.: US 10,956,988 B2
(45) Date of Patent: Mar. 23, 2021

(54) SYSTEM AND METHOD FOR DETERMINING A TAXABILITY STATUS FOR A VEHICULAR ASSET

(71) Applicant: Scott Beale, Mayfield Heights, OH (US)

(72) Inventor: Scott Beale, Mayfield Heights, OH (US)

( * ) Notice: Subject to any disclaimer, the term of this patent is extended or adjusted under 35 U.S.C. 154(b) by 353 days.

(21) Appl. No.: 15/632,661

(22) Filed: Jun. 26, 2017

(65) Prior Publication Data

US 2018/0374161 A1 Dec. 27, 2018

(51) Int. Cl.
*G06Q 40/00* (2012.01)
*G08G 5/00* (2006.01)
*G01S 13/72* (2006.01)

(52) U.S. Cl.
CPC .......... *G06Q 40/123* (2013.12); *G01S 13/723* (2013.01); *G06Q 40/10* (2013.01); *G06Q 40/12* (2013.12); *G08G 5/00* (2013.01)

(58) Field of Classification Search
CPC ...... G06Q 40/00; G06Q 40/123; G06Q 40/12; G06Q 40/10; G08G 5/00; G01S 13/72; G01S 13/723
See application file for complete search history.

(56) References Cited

U.S. PATENT DOCUMENTS

| 4,827,419 | A * | 5/1989 | Selby, III | G01C 21/20 |
| | | | | 701/528 |
| 9,530,323 | B1 * | 12/2016 | Maji | G08G 5/0021 |
| 2002/0091756 | A1 * | 7/2002 | Goodwin | G06F 11/1446 |
| | | | | 709/203 |
| 2008/0158041 | A1 * | 7/2008 | Crudeli | G01S 7/003 |
| | | | | 342/36 |
| 2011/0144897 | A1 * | 6/2011 | Dunsky | G08G 5/00 |
| | | | | 701/122 |
| 2015/0058184 | A1 * | 2/2015 | Clark | G06Q 40/12 |
| | | | | 705/30 |
| 2016/0101855 | A1 * | 4/2016 | Stefani | G08G 5/0008 |
| | | | | 701/2 |
| 2017/0358212 | A1 * | 12/2017 | Godwin | G08G 5/006 |

OTHER PUBLICATIONS

"How it Works, Mar. 1, 2017 https://www.flightradar24.com/how-it-works (p. 8 of 13)" (Year: 2017).*
"N12028, Jun. 6, 2017, https://www.flightradar24.com/data/aircraft/n12028/(p. 14/14)" (Year: 2017).*

* cited by examiner

*Primary Examiner* — Kenneth Bartley
*Assistant Examiner* — Gregory M James
(74) *Attorney, Agent, or Firm* — Medley, Behrens & Lewis, LLC

(57) ABSTRACT

Disclosed embodiments provide techniques for determining a taxability status for a vehicular asset, such as an aircraft. The techniques include obtaining traffic control system information for the vehicular asset, detecting gaps in traffic control system information for the vehicular asset, and recording the gaps, computing a primary location for the vehicular asset based on the traffic control system information, and creating a vehicular asset taxability status report for the vehicular asset, where the report includes the primary location and gap information.

16 Claims, 7 Drawing Sheets

| REG. NUM | CALL SIGN | DEPART. LOCATION | ARRIVAL LOCATION | ARRIVAL DATE | DEPART. DATE | STAY |
|---|---|---|---|---|---|---|
| N714XR | N/A | PIT | ROA | Apr 3 | Apr 5 | 3 |
| N714XR | N/A | ROA | ZZV | Apr 5 | Apr 6 | 2 |
| N714XR | N/A | PKB | ROA | Apr 11 | Apr 12 | 2 |
| N662CT | ABC123 | PIT | ROA | Apr 8 | Apr 8 | 1 |

FIG. 3

Vehicular Asset Taxability Status Report – ZZV for the year 20XX — 702, 704

700

706
N-number: N714XR
Serial Number: BB-1230
Year MFR: 2004
Name: King Shuttle, LLC
123 Any Street
Austin TX, 78719
MFR Name: Beech
Model: B200

710
Appraised Value: $1,860,000
Tax Value: $27,900 (1.5%)

708
Owner: King Shuttle, LLC
Owner phone: 432-555-1234
Owner State: TX
Operator Contact: Richard King
Operator phone: 432-555-2334
Chief Pilot: Jim Lovell
Chief Pilot phone: 654-555-8765

714
AIRPORT ACTIVITY:

| AP | DEP | % | Arr | % |
|----|-----|------|-----|------|
| ZZV | 55 | 27.1 | 55 | 27.1 |
| ROA | 11 | 5.4 | 11 | 5.4 |
| PIT | 9 | 4.4 | 10 | 4.9 |

712

| TOP THREE AIRPORTS (Days) | |
|---|---|
| ZZV | 213 |
| ROA | 88 |
| PIT | 34 |

716
Data Gaps: 6

FIG. 7

SYSTEM AND METHOD FOR DETERMINING A TAXABILITY STATUS FOR A VEHICULAR ASSET

FIELD OF THE INVENTION

The present invention relates generally to asset monitoring.

BACKGROUND

Transportation continues to be vital in our daily lives. People and goods often travel using commercial vehicles such as aircraft, boats, trains, and motor vehicles. While airlines carry a majority of air passengers, a considerable number of passengers travel via general aviation aircraft such as business jets. Recent reports have indicated that general aviation adds up to 1.1 million jobs and contributes over $200 billion to the U.S. economy. General aviation enables businesses to enable face-to-face contacts which can be vital for certain businesses. In addition to business travel, general aviation can provide other vital services, such as emergency medical flights, aerial firefighting flights, law enforcement flights, flight training, time-sensitive cargo flights, aerial photography/surveillance, personal travel, as well as agricultural functions.

Recent reports indicate that there are about 15,000 business aircraft registered in the United States. A "Business aircraft" is defined as fixed-wing turbine aircraft plus piston (single and twin engine) general aviation aircraft and flown as business or corporate operations as determined by the Federal Aviation Administration (FAA). About 3 percent of these aircraft are flown by Fortune 500 companies, while the remaining 97 percent encompass a broad cross-section of operators that are primarily businesses of all sizes. Business aircraft operators are registered in every state in the country.

People and companies that rely on business aviation represent many different professions and locations, but they all share the need for fast, flexible, safe, secure and cost-effective access to destinations across the country and around the world. In many instances, business aviation is the appropriate transportation solution, opening the door to global commerce for small-community and rural populations by linking them directly to population centers and manufacturing facilities.

SUMMARY

Disclosed embodiments provide a transient asset tax recovery system that is developed for aircraft including private, business and commercial assets with particular attention towards private/business turbine assets with higher dollar amounts. The unique and primary function of disclosed embodiments is to utilize the Federal Aviation Administration (FAA) historical Air Traffic Control (ATC) database and the patent algorithms to determine the aircraft tax jurisdiction first and then determine which taxpayers have not paid historical tax or have under-reported/under-paid taxes. The data mining software system integrates over eight databases (listed below) to determine aircraft identification with owner, asset tax jurisdiction, historical tax paid/unpaid, asset valuation, estimated tax owed and reporting information. The system end result and benefit is to recovery unpaid and underpaid taxes on behalf of government entities which include property taxes, sales and use tax, commercial operations tax, lease taxes, apportionment taxes and a host of registration type tax. Approximately 50% of the Continental United States have no significant property tax (i.e. Ohio), while the other 50% have significant property taxes which can reach up to $20,000 per $1 million in value per year. The state property tax inconsistency often influences the taxpayer to mis-report their aircraft in a state which has no property tax ultimately avoiding the tax. Due to the transient nature of aircraft, single government entities with limited resources and not working together with other entities struggle to identify the aviation taxes, evaluate the aircraft and recover taxes.

The system is a unique one of a kind system unknown currently in the marketplace. There is a half dozen or so tax recovery companies nationwide specializing in helping the government with tax recovery, property valuations and tax collection. None of them have a registered system for completing their services on vehicular assets.

In one aspect, there is provided a computer-implemented method for determining a taxability status for a vehicular asset, comprising: obtaining traffic control system information for the vehicular asset; detecting gaps in traffic control system information for the vehicular asset, and recording the gaps; computing a primary location for the vehicular asset based on the traffic control system information; and creating a vehicular asset taxability status report for the vehicular asset, wherein the report includes the primary location and gap information.

In another aspect, there is provided a system for determining a taxability status for a vehicular asset, comprising: a processor; a memory coupled to the processor, wherein the memory contains instructions, that when executed by the processor, cause the system to perform steps of: obtaining traffic control system information for the vehicular asset; computing a primary location for the vehicular asset based on the traffic control system information; detecting gaps in traffic control system information for the vehicular asset, and recording the gaps; and creating a vehicular asset taxability status report for the vehicular asset, wherein the report includes the primary location and gap information.

In yet another aspect, there is provided a computer program product embodied in a non-transitory computer readable medium for determining a taxability status for a vehicular asset, the computer program product comprising instructions which cause one or more processors to perform operations of: obtaining traffic control system information for the vehicular asset; computing a primary location for the vehicular asset based on the traffic control system information; detecting gaps in traffic control system information for the vehicular asset, and recording the gaps; and creating a vehicular asset taxability status report for the vehicular asset, wherein the report includes the primary location and gap information.

BRIEF DESCRIPTION OF THE DRAWINGS

The structure, operation, and advantages of the present invention will become further apparent upon consideration of the following description taken in conjunction with the accompanying figures (FIGs.). The figures are intended to be illustrative, not limiting.

Certain elements in some of the figures may be omitted, or illustrated not-to-scale, for illustrative clarity. The cross-sectional views may be in the form of "slices", or "near-sighted" cross-sectional views, omitting certain background lines which would otherwise be visible in a "true" cross-sectional view, for illustrative clarity. Furthermore, for clarity, some reference numbers may be omitted in certain drawings.

FIG. 3 shows example traffic control system data.

FIG. 7 shows an exemplary vehicular asset taxability status report in accordance with embodiments of the present invention.

DETAILED DESCRIPTION

Figure 1:
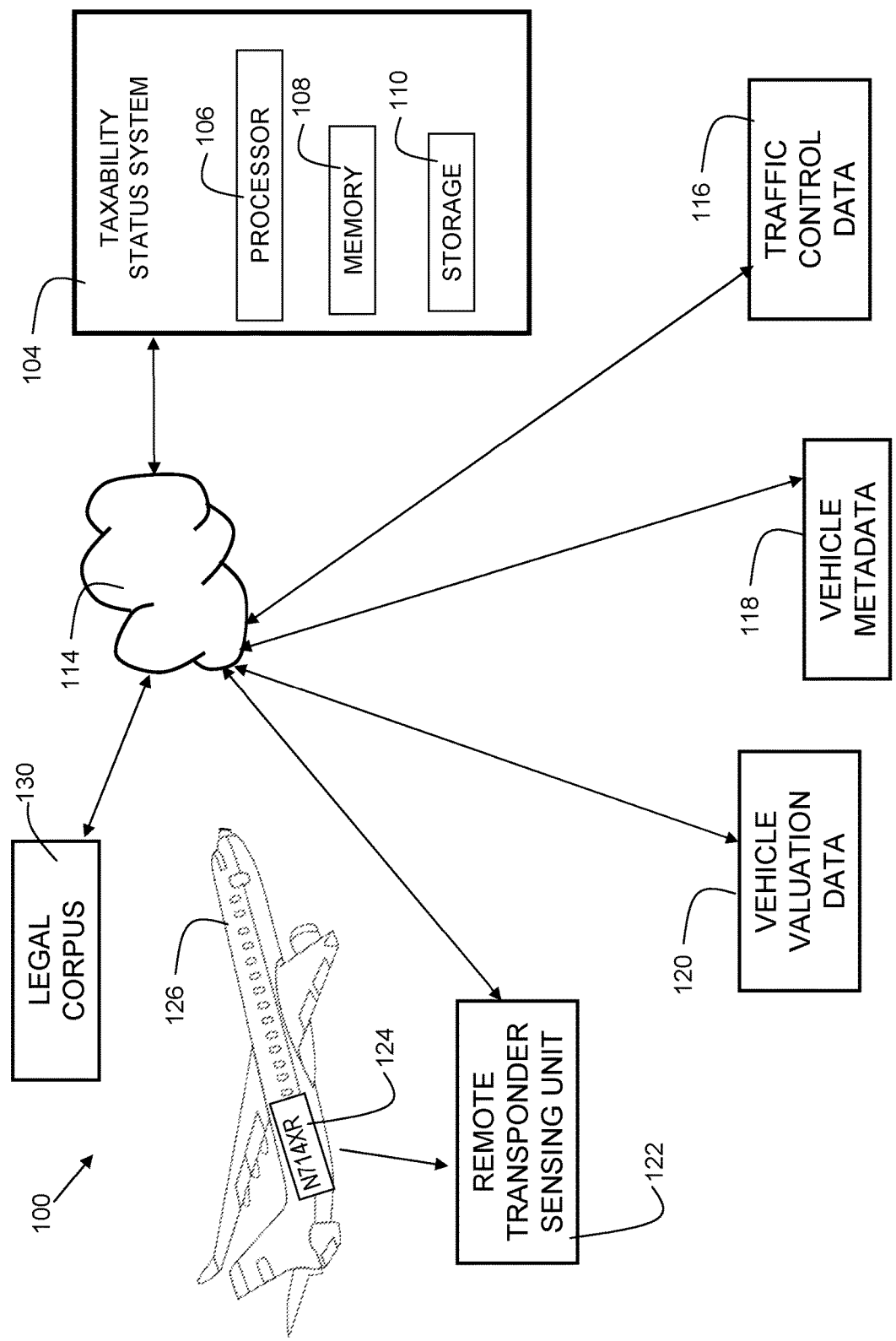
FIG. 1 shows a system in accordance with embodiments of the present invention.

General aviation aircraft such as business jets typically cost at least one to two orders of magnitude more than a typical automobile. Some modern business jets can have a value in excess of $50 million. These aircraft rely on the infrastructure provided by airports and air traffic control (ATC) facilities throughout the country. Tax jurisdictions such as states, counties and municipalities collect a variety of taxes from the aviation community to support this infrastructure. There are a variety of taxes and fees that can be assessed. There are use taxes which are a function of how often an aircraft uses a particular airport. Additionally, there are property taxes and/or registration fees that are a function of where the aircraft has spent a significant amount of time, as well as the value and/or type of aircraft.

Some of the taxes assessed may include, but are not limited to,

1) Property or Advalorem Tax.
2) Sales and Use Tax.
3) Apportioned taxes for commercial and multi-state based operators
4) Lease and Commercial Operations tax
5) Aircraft parts and maintenance tax
6) Aviation fuel tax; and
7) Airport landing, registration and other fees Because aircraft are relatively expensive, the tax liability owed to a jurisdiction can be significant. However, because aircraft are movable assets, accurate assessment of tax liability can be challenging. In some states property taxes can mount up annually to a significant amount. States that impose property taxes on aircraft include California, Georgia and Wyoming. Recent information indicates that there are over twenty states that impose some sort of property tax. As with real estate, property taxes on aircraft are usually levied at the local level. Even states that don't have a "property" tax on aircraft per se may have a similar tax under another name, such as a tax on "assets owned by businesses" or "income-producing assets."

Aircraft registration fees are typically charged in place of a property tax, although Utah and a few other states charge both. One way for a state to stay on top of collecting sales and use tax on aircraft hangared within its borders is to require the aircraft to be registered. Thus, tax liability for aircraft is an extremely complex matter, as different jurisdictions have different rules, and different criteria for when those rules apply.

The Air Traffic Control (ATC) system records data of filed flight plans and actual air traffic radar hits. The FAA SWIM Flight Data Publication Service (SFDPS) makes such data available to a limited audience. However, merely tracking this data is insufficient to gain a full picture of aircraft activity as it pertains to taxes. There can be gaps in the ATC data. The most common instance of this occurs when an airplane flies to another airport under visual flight rules (VFR). In such an instance, it is possible for an aircraft to move to another tax jurisdiction without creating an indication of the activity within the ATC data. Further complicating the tracking is that ATC data can sometimes use call signs in place of an aircraft registration number (i.e. "N-number"). Thus, it can be very challenging to obtain an accurate record of aircraft activity simply by examining ATC data.

Disclosed embodiments provide a solution that allows tax jurisdictions such as states, counties, cities, and other regional jurisdictions to obtain detailed information about aircraft activity and identify potentially owed taxes. This can enable the jurisdictions to collect the revenues they are owed, which enables continued maintenance of the airport infrastructure.

Disclosed embodiments provide techniques for determining a taxability status for a vehicular asset, such as an aircraft. The techniques include obtaining traffic control system information for the vehicular asset, detecting gaps in traffic control system information for the vehicular asset, and recording the gaps, computing a primary location for the vehicular asset based on the traffic control system and remote transponder sensing unit's information, and creating a vehicular asset taxability status report for the vehicular asset, where the report includes the primary location and gap information.

FIG. 1 shows a system 100 for determining a taxability status for a vehicular asset in accordance with embodiments of the present invention. System 100 includes a taxability status system 104. In embodiments, the taxability status system 104 is implemented as a computer comprising a processor 106, and memory 108 coupled to the processor. The memory 108 may be a non-transitory computer readable medium. Memory 108 may include RAM, ROM, flash, EEPROM, or other suitable storage technology. The memory 108 contains instructions, that when executed by processor 106, enable communication with a variety of other devices and data stores. In embodiments, network 114 may include the Internet.

The taxability status system 104 may communicate with an air traffic control data source 116. The air traffic control data source 116 may include data from the FAA SWIM Flight Data Publication Service (SFDPS). The air traffic control data may include, but is not limited to, a departure airport, an arrival airport, a departure date, a departure time, an arrival date, an arrival time, an aircraft type, and/or a registration number. In embodiments, the registration number can serve as a vehicle identification number for the aircraft.

The taxability status system 104 may communicate with a vehicle metadata source 118. The vehicle metadata source 118 may include FAA vehicle registration data. The vehicle metadata may include, but is not limited to, a vehicle serial number, an aircraft manufacturer name, an aircraft model (vehicle model type), an aircraft type, a year of manufacture for the aircraft (vehicle manufacture date), registered owner information, an engine manufacturer, and/or a vehicle engine type in addition to a significant amount of the vehicle specifications, equipment and statistics on said aircraft for purposes of evaluating the vehicle once jurisdiction is determined.

The taxability status system 104 may communicate with a vehicle valuation source 120. The vehicle valuation source 120 may include data from one or more subscription-based services to provide an estimate of current value based on individual aircraft details. Such services may include, but are not limited to, the Aircraft Blue Book and VREF valuation guides. The current value can be used as part of tax liability assessment in certain cases, depending on the rules and regulations of a particular tax jurisdiction. In addition, the JETNET and AMSTAT® services may be utilized, which are the aircraft databases which keep records on each and every aircraft to include owner information, operator information, pilot/Chief Pilot information, manufactured year, aircraft equipment and specifications, airframe/engine times, pictures of the aircraft and interior, etc. The information in this system provides all of the particular details which feed the VREF, AMSTAT and an Appraisal database.

The data from the sources 116, 118, and 120 may be stored within storage 110. In embodiments, a database format such as a structured query language (SQL) format is used to store the data. In embodiments, data may be filtered, and/or output in a different format, such as CSV, to enable processing by spreadsheets and/or other programs.

The system 100 may optionally include one or more remote transponder sensing units 122. The remote transponder sensing unit 122 is an electronic device that is installed in proximity to an airport such that it can detect transponder information from an aircraft 126 where the information includes a registration number 124 that is associated with the aircraft 126. The data from the remote transponder sensing unit 122 can be used to reconcile gaps in the air traffic control information. In embodiments, the remote transponder sensing unit 122 may receive information from an automatic dependent surveillance-broadcast (ADS-B) transponder, and receive data from and/or interrogate a mode S transponder, and/or a mode C transponder. The transponder is installed on an aircraft as part of its electronic safety equipment. It may broadcast an identifying code such as a registration number or other code that is linked to a registration number. In some embodiments, the remote transponder sensing unit may interrogate the transponder in order to receive a reply from the transponder containing the information. The information may further include information such as altitude and speed information. The altitude and speed information can be used to confirm that the aircraft in question was taking off or landing at the airport. The information may further include other aviation parameters, including, but not limited to, aircraft type, latitude, longitude, and/or heading.

The system 100 may optionally communicate with legal corpus 130 to access laws, rules, regulations, tax rates, and other information that can be used to provide computer-implemented automated estimated tax liabilities. This allows convenient notification of jurisdiction authorities regarding potentially owed tax revenue from aircraft operators and/or owners.

Embodiments combine data from the traffic control data 116, vehicle metadata 118, vehicle valuation data 120, and/or remote transponder sensing unit data 122 to reconcile gaps in the traffic control data. The system 100 can then compute a primary location for the purposes of property taxes, and estimate, based on information from legal corpus data 130, a tax liability that is owed to that jurisdiction for the aircraft 126. In the event, that the aircraft has primary locations which share tax reciprocity and apportionment, the system can determine the prorate share to the multiple jurisdictions.

Figure 2:
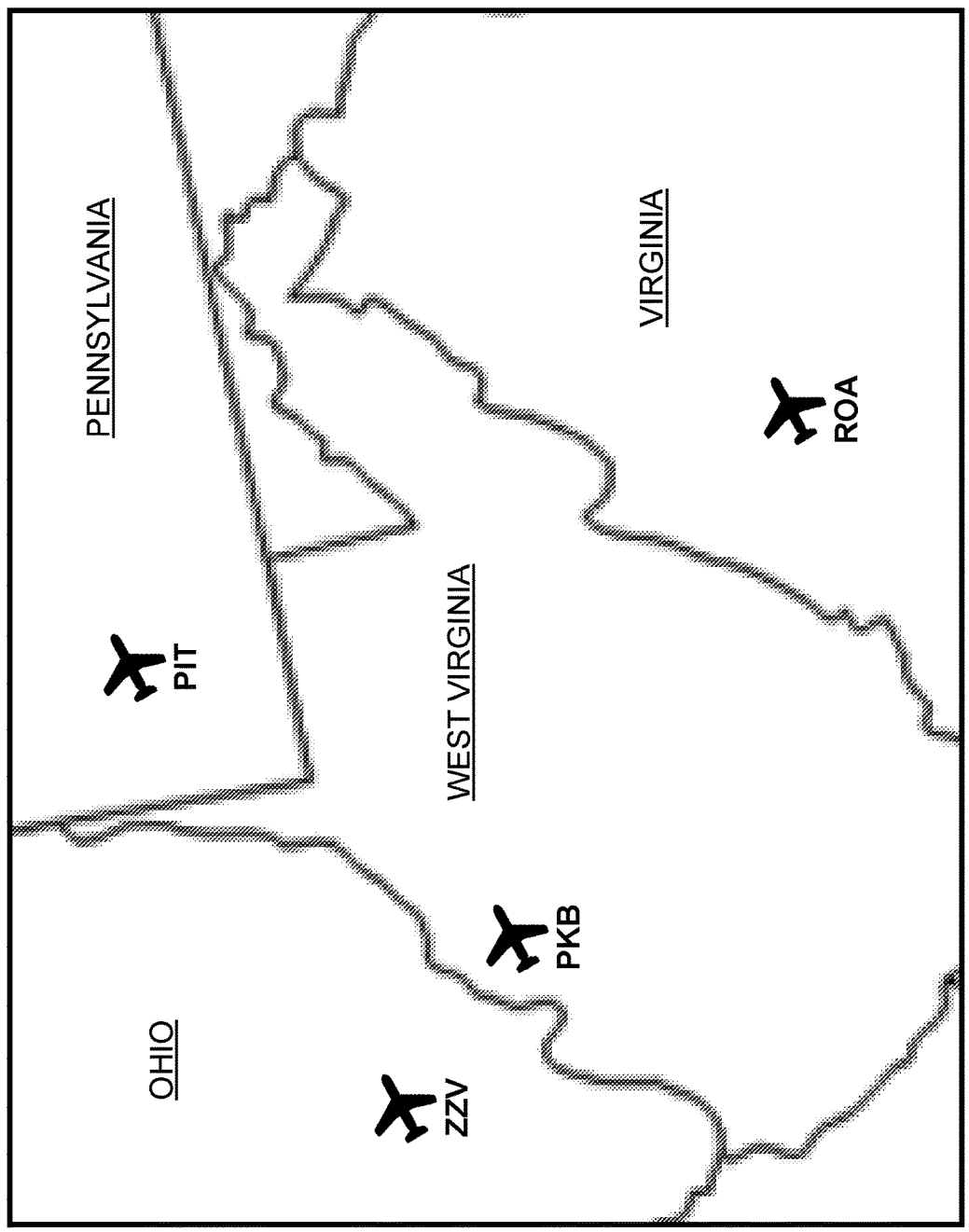
FIG. 2 shows examples of multiple jurisdictions.

FIG. 2 shows examples of multiple jurisdictions. The map 200 indicates four airports. Airport ZZV corresponds to in Zanesville Municipal Airport in Muskingum County, Ohio. PKB corresponds to Mid-Ohio Valley Regional Airport in Wood County, W. Va. ROA corresponds to Roanoke Regional Airport, in Roanoke County, Va. PIT corresponds to Pittsburgh International Airport Allegheny County, Pa. For the purposes of illustrating disclosed embodiments, each of the states shown with an airport in map 200 is assumed to be a tax jurisdiction with a different tax rate. This information is merely illustrative and is not intended to reflect actual tax information. Furthermore, while in the example, the tax jurisdictions are assumed to be statewide, in practice tax jurisdictions may be counties, cities, or other regions.

For the purposes of example only, it is to be considered that Ohio has a property tax of 1.5 percent of an aircraft value if the aircraft spends 185 days or more hangared in Ohio. It is furthermore to be considered that West Virginia does not levy a property tax on aircraft. It is furthermore to be considered that Virginia levies a use tax of $100 per landing per aircraft. It is furthermore to be considered that Pennsylvania has a property tax of 1 percent of an aircraft value if the owner resides in Pennsylvania. As stated previously, this information is merely illustrative for the purposes of explaining the function of disclosed embodiments, and is not intended to reflect actual tax information.

Using the aforementioned example, it can be seen how tax liability can be difficult to assess. Due to actions of the aircraft operator, the aircraft location as indicated by the air traffic control system may not be indicative of the actual whereabouts of the aircraft. Again, based on the previous example rules for the tax jurisdictions of map 200, it can be possible for an aircraft operator (either intentionally, or unintentionally) to create a situation where tax revenue owed a jurisdiction can go undetected. Since West Virginia has no aircraft property tax, an aircraft operator can fly an aircraft to PKB with a flight plan, and thus indicated in air traffic control data. The operator can then fly from PKB to ZZV under visual flight rules, and thus reside in Ohio, while appearing to be hangared in West Virginia. Disclosed embodiments can identify such conditions by using data from a remote transponder sensing unit. In this example, when the aircraft lands at ZZV, even under VFR conditions, the registration number is detected based on transponder data from the aircraft, retrieved by the taxability status system 104, and considered to be located in Ohio, even though the air traffic control information does not indicate the VFR trip from PKB to ZZV. In this case, the Ohio tax authorities can receive a report indicating the occurrence so the proper taxes can be collected.

In a similar manner, since Virginia includes a use tax for each landing, if an operator uses VFR to ferry an aircraft from PKB to ROA, and then VFR to again take the aircraft from ROA back to PKB, then the takeoff and landing from ROA has the potential to be unreported. Again, using a remote transponder sensing unit installed in proximity to ROA, the transponder information from the aircraft is recorded, and retrieved by the taxability status system 104, and considered to have landed at ROA in Virginia, even though the air traffic control information does not indicate that the aircraft had traveled to ROA. In this case, the Virginia tax authorities can receive a report indicating the occurrence so the proper taxes can be collected.

In a similar manner, if an aircraft spends 53% of the year hangared at PKB in West Virginia, and 40% of its time hangared at PIT in Pennsylvania, and the owner has a Pennsylvania address, then the primary location of the aircraft may be deemed to be Pennsylvania, even though that is not the location where the aircraft was hangared for the most time. Thus, in embodiments, computing a primary location comprises: computing a list of airplane storage locations indexed by duration; selecting a primary location based on the owner address and a duration of an airport storage location from the list of airport storage locations, wherein the duration exceeds a predetermined threshold, and wherein the airplane storage location and the owner address are in a common tax jurisdiction.

FIG. 3 shows an example 300 of traffic control system data. This data may be stored within taxability status system 104 in a database format, CSV format, binary format, or other suitable data format. Column 302 shows a registration number (also referred to as a "tail number" or "N-number"). Column 304 shows a call sign. Not all aircrafts use a call sign, but some may use a call sign when interacting with the air traffic control system. Column 306 shows a departure location. Column 308 shows an arrival location. Column 310 shows an arrival date, indicating when the aircraft arrived at an airport. Column 312 shows a departure date, indicating when an aircraft departed an airport. Column 314 indicates a duration/stay at an airport by the aircraft.

Of particular note is the occurrence of gaps in the traffic control system data. For example, rows 322, 324, and 326 all pertain to the same aircraft, having a registration number of N714XR. Row 322 shows record of a flight from PIT to ROA. Row 324 shows the next flight of the aircraft from ROA to ZZV. Row 326 shows the next flight of the aircraft from PKB to ROA. Embodiments detect that the departing location of a flight is different than the arrival location of the previous flight of that aircraft, and indicate it as a gap. Thus, a gap occurs when there is a mismatch between the departing location of a flight and the previous arrival of that flight. While it is possible that an aircraft can be moved on land (e.g. by truck) from one location to another, a more typical scenario to explain the gap is that the aircraft made a VFR flight from ZZV to PKB. Again, using a remote transponder sensing unit installed in proximity to airports, the transponder information from the aircraft is recorded, and retrieved by the taxability status system 104, and the VFR flights can be considered so that the proper taxes can be collected. Row 328 shows data for an aircraft that is correlated with a call sign. In this case, the registration number N662CT is correlated with call sign ABC123.

Figure 4:
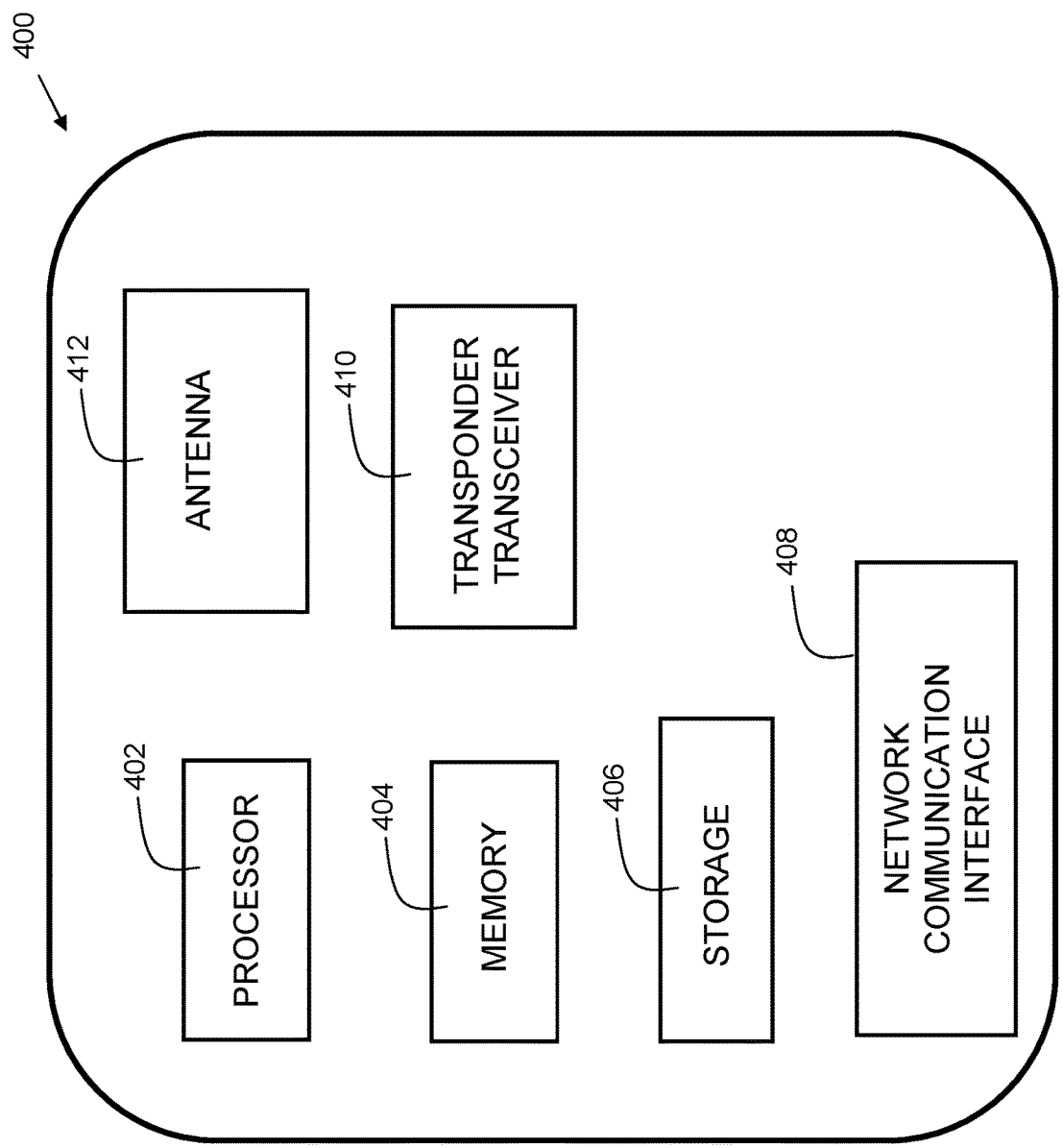
FIG. 4 is a block diagram of a remote transponder sensing unit in accordance with embodiments of the present invention.

FIG. 4 is a block diagram of a remote transponder sensing unit 400 in accordance with embodiments of the present invention. Remote transponder sensing unit 400 includes a processor 402, a memory 404 coupled to the processer 402, and storage 406. The memory 404 may be a non-transitory computer readable medium. Memory 404 may include RAM, ROM, flash, EEPROM, or other suitable storage technology. The memory 404 contains instructions, that when executed by processor 402, enable communication aircraft transponders via transponder transceiver 410. The transceiver is coupled to antenna 412 to enable transmitting and/or receiving signals from aircraft. Remote transponder sensing unit 400 further includes a network communication interface 408. In embodiments, network communication interface 408 includes a wireless communications interface such as a cellular data interface and/or a Wi-Fi interface. In embodiments, the storage 406 stores aircraft activities (such as takeoffs and landings) detected from nearby transponders. The data may then be periodically downloaded by the taxability status system 104 via network communication interface 408. In embodiments, the remote transponder sensing unit 400 may be installed near an airport runway, such that it can receive the identifying data from an aircraft transponder as it takes off or lands. In embodiments, the remote transponder sensing unit 400 may be used for associating a call sign with an aircraft registration number. For example, if air traffic control data has a record of an aircraft with a call sign of ABC123 landing at the same time that the remote transponder sensing unit 400 detects an aircraft with a registration number of N662CT, then the call sign of ABC123 is associated with the registration number of N662CT. Thus, embodiments include associating a call sign with a registration number of the aircraft.

Figure 5:
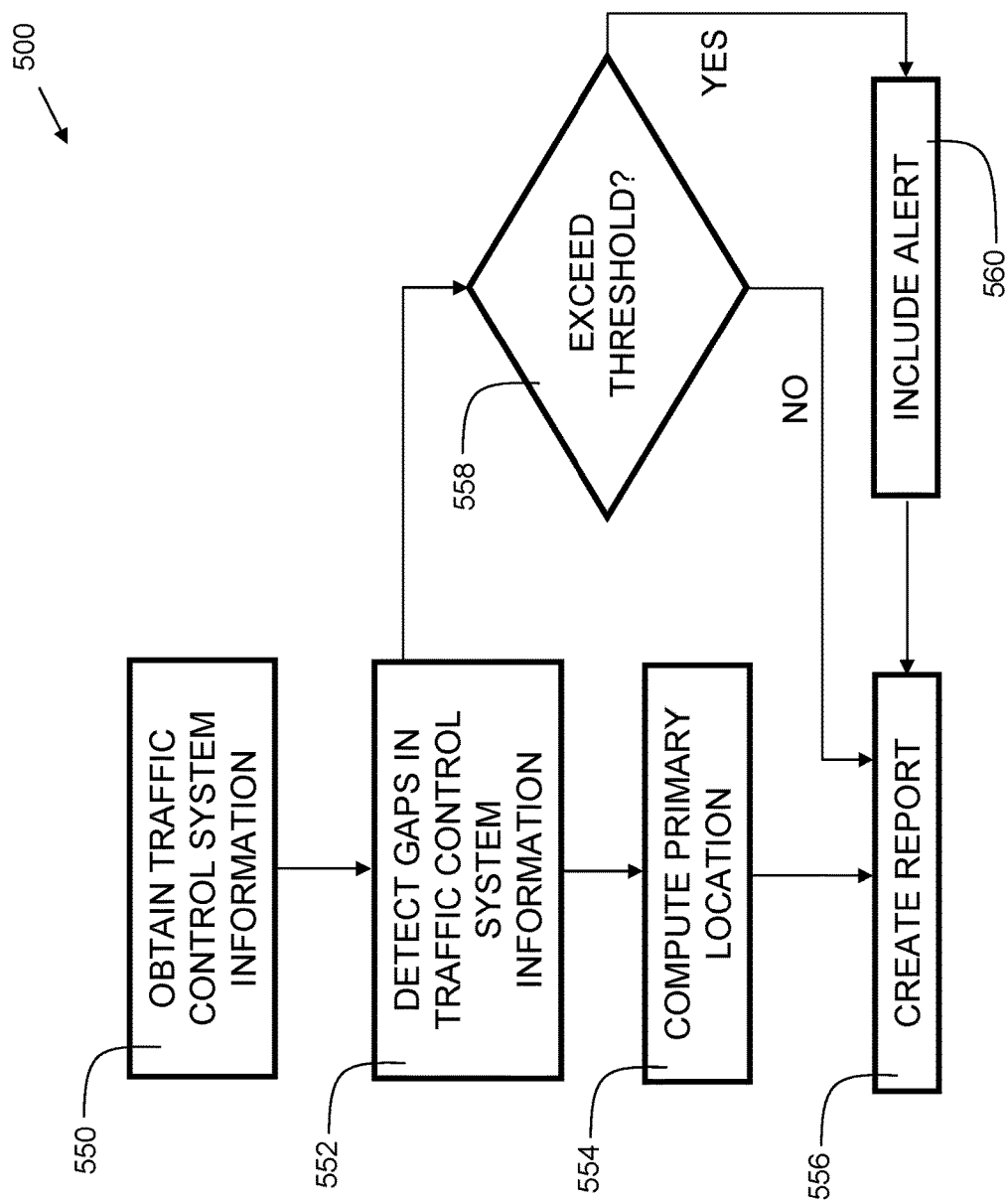
FIG. 5 shows a flowchart indicating process steps for embodiments of the present invention.

FIG. 5 shows a flowchart 500 indicating process steps for embodiments of the present invention. In process step 550, traffic control system information is obtained. This can include data from the FAA SWIM Flight Data Publication Service (SFDPS) and well as the Remote Transponder Transceiver. In process step 552, gaps are detected in the traffic control system information. In embodiments, this can include performing a check, for a given aircraft, that a departure airport matches the arrival airport of the previous landing. If it does not (as shown in row 326 of FIG. 3), then it is considered as a gap. In process step 554, a primary location is computed. In embodiments, the primary location is the location the aircraft is deemed to be hangared at for tax purposes. In process step 558, a check is made to see if the number of gaps detected exceeds a predetermined threshold. If so, then an alert is included at 560, which is included in the vehicular asset taxability status report created at process step 556. The alert provides an indication of possible unrecovered tax revenue, due to gaps that may result in missing tax collection opportunities at various jurisdictions.

Figure 6:
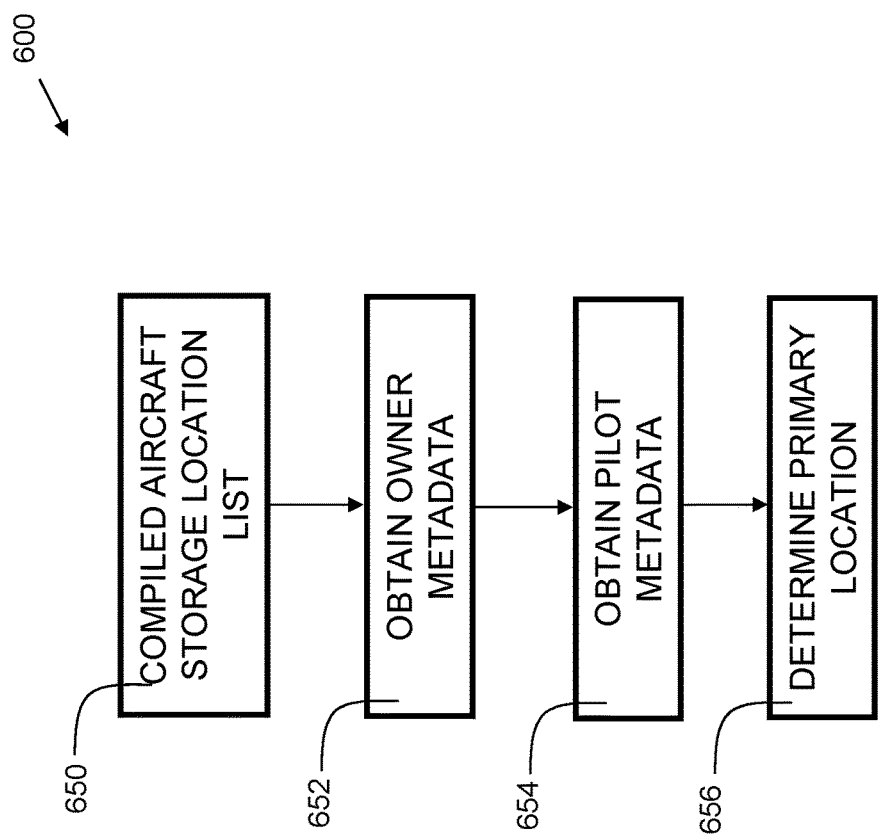
FIG. 6 shows a flowchart indicating additional process steps for embodiments of the present invention.

FIG. 6 shows a flowchart 600 indicating additional process steps for embodiments of the present invention. In some cases, the primary location is the location where the aircraft has been hangared for the most time within a given tax period. However, in certain cases, another location may be considered as the primary location. Other metadata, such as owner and/or pilot residence may be a factor in determining the primary location. In process step 650, an aircraft storage location list is compiled. In embodiments, this may include the top three airports where the aircraft spent the most time. In process step 652, owner metadata is obtained. In embodiments, the owner metadata may be obtained from FAA registration information, and/or other sources. In process step 654, pilot metadata is obtained, if available. In embodiments, the pilot metadata may include an address and/or telephone number for the chief pilot of the aircraft. In process step 656 a primary location is determined. As stated previously, in some cases, the primary location may be augmented with the owner and/or pilot metadata. As in the previously stated example, if an aircraft spends 53% of the year hangared at PKB in West Virginia, and 40% of its time hangared at PIT in Pennsylvania, and the owner has a Pennsylvania address, then the primary location of the aircraft may be deemed to be Pennsylvania, even though that is not the location where the aircraft was hangared for the most time.

FIG. 7 shows an exemplary vehicular asset taxability status report 700 in accordance with embodiments of the present invention. In embodiments, the report 700 may be prepared for a given aircraft, and the tax liability may be assessed for a given airport 702, for a given tax period 704.

The report 700 may include a registration section 706. In embodiments, the registration section 706 may include, but is not limited to a registration number for the aircraft, a serial number for the aircraft, a manufacture year for the aircraft, a name of the operator, an address of the operator, the manufacturer of the aircraft, and/or the model of the aircraft.

The report 700 may include a personnel section 708. In embodiments, the personnel section 708 may include, but is not limited to an owner name, an owner phone number, an owner state, an operator contact, an operator phone number, a chief pilot name, and/or a chief pilot phone number.

The report 700 may include an estimated tax liability section 710. In embodiments, the estimated tax liability section 710 may include, but is not limited to an appraised value, and a tax value. The appraised value may be determined based on vehicle metadata 118 and vehicle valuation data 120. The tax value may be based on information obtained from legal corpus 130 which may include rules, regulations, tax tables, and other tax information for one or more jurisdictions.

The report 700 may include a most frequently visited airport section 712. In embodiments, the most frequently visited airport section 712 may include, but is not limited to the top three airports visited, and the amount of time spent at each of the airports within the tax period.

The report 700 may include an airport activity section 714. In embodiments, the airport activity section 714 may include, but is not limited to the number of arrivals and departures at each of the airports listed in most frequently visited airport section 712. The airport activity section 714 may further include The report 700 may include a data gaps section 716. The data gaps section provides an indication of how many data gaps exist within the tax period of the report. While a few gaps may be expected over the course of a year, if there are too many gaps, then an alert message may be included in the report to call attention to the excessive number of gaps. Thus, embodiments include indicating an alert on the report in response to detecting gaps above a predetermined threshold.

In addition to the information shown in FIG. 7, a variety of additional information can be shown. Furthermore, report generation options can include information organized in numerous ways. Embodiments may include data organized by airport and/or by aircraft. Embodiments may include filters that show data only for aircraft that have landed at an airport in excess of a predetermined number of landings. Embodiments may include filters that show data only for aircraft that have been hangared at an airport in excess of a predetermined number of days. Embodiments may include filters that show data only for aircraft that have traffic control data gaps in excess of a predetermined number of gaps. Other filters and sorting methods are possible to facilitate convenient and effective collection of tax revenue based on aircraft value and itinerary.

As can now be appreciated, disclosed embodiments provide improvements in determining a taxability status for a vehicular asset. Vehicles such as aircraft can cost well over a million dollars. As such, the tax liabilities for a jurisdiction can be in the tens of thousands of dollars or more in certain cases. Allowing jurisdictions such as states and counties to recoup some of the tax revenue they are owed can serve to provide funds for airport infrastructure maintenance and improvements. While the aforementioned examples are primarily directed to aircraft, disclosed embodiments can be used for other vehicular assets, such as boats, yachts, large shipping vessels, trains, recreational vehicles (RVs), motor homes, and the like.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, circuits, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

What is claimed is:

1. A computer-implemented method, comprising:
   obtaining traffic control system information for an aircraft from a first database, the traffic control system information indicative of departures and arrivals of the aircraft at a plurality of airports;
   detecting a gap in the traffic control system information for the aircraft, the gap being indicative of a time for which a location of the aircraft is indeterminate based upon the traffic control system information, wherein the gap is detected based on a mismatch in the traffic control system information between a departure location of the aircraft and a previous arrival location of the aircraft;
   receiving transponder data from a transponder that is mounted on board the aircraft by way of a transceiver positioned in proximity to an airport, the transponder data indicative of at least one of an altitude or a speed of the aircraft;
   determining, based upon the at least one of the altitude or the speed of the aircraft indicated in the transponder data, that the aircraft landed at the airport during the time for which the location of the aircraft was indeterminate; and
   computing, by a computer, a taxability status of the aircraft based upon the aircraft being present at the airport during the time for which the location of the aircraft was indeterminate.

2. The method of claim 1, further comprising obtaining vehicle metadata for the aircraft.

3. The method of claim 2, wherein obtaining vehicle metadata for the aircraft comprises obtaining a vehicle serial number.

4. The method of claim 2, wherein obtaining vehicle metadata for the aircraft comprises obtaining a vehicle engine type.

5. The method of claim 2, wherein obtaining vehicle metadata for the aircraft comprises obtaining a vehicle model type.

6. The method of claim 2, wherein obtaining vehicle metadata for the aircraft comprises obtaining a vehicle manufacture date.

7. The method of claim 1, further comprising obtaining owner metadata for the aircraft.

8. The method of claim 7, wherein obtaining owner metadata for the aircraft comprises obtaining an owner address.

9. The method of claim 1, further comprising obtaining pilot metadata for the aircraft.

10. The method of claim 9, wherein obtaining pilot metadata for the aircraft comprises obtaining a pilot address.

11. The method of claim 1, further comprising associating a call sign with a registration number of the aircraft.

12. The computer-implemented method of claim 1, wherein the traffic control system information is first traffic control system information, where receiving the first traffic control system information for the aircraft comprises receiving second traffic control system information for a plurality of aircraft that includes the aircraft, the second traffic control system information for the plurality of aircraft indicates the departures and arrivals of the aircraft based upon a callsign of the aircraft, the method further comprising:
  receiving second transponder data from the transponder that is mounted on board the aircraft, the second transponder data including a registration number of the aircraft
  determining that the callsign and the registration number are representative of the same aircraft based upon the second transponder data and the second traffic control system information, wherein determining that the aircraft was present at the airport at the time for which the location of the aircraft is indeterminate is based further upon the callsign and the registration number being determined to be representative of the same aircraft.

13. A system, comprising:
  a transponder transceiver positioned in proximity to an airport, and that is configured and disposed to receive transponder data from an automatic dependent surveillance-broadcast (ADS-B) transponder mounted on an aircraft, the transponder data indicative of at least one of an altitude or a speed of the aircraft;
  a processor; and
  a memory coupled to the processor, wherein the memory contains instructions, that when executed by the processor, cause the system to perform steps of:
    obtaining traffic control system information for the aircraft from a first database, the traffic control system information indicative of departures and arrivals of the aircraft at a plurality of airports, the traffic control system information including a mismatch between a departure location of the aircraft and a previous arrival location of the aircraft, the mismatch indicative of a time during which a location of the aircraft is indeterminate;
    determining, based upon the at least one of the altitude or the speed of the aircraft indicated in the transponder data, that the aircraft landed at the airport during the time for which the location of the aircraft was indeterminate; and
    computing a taxability status of the aircraft based upon the aircraft being present at the airport during the time for which the location of the aircraft was indeterminate.

14. The system of claim 13, wherein the memory further comprises instructions, that when executed by the processor, cause the system to determine that the mismatch between the departure location and the previous arrival location pertains to a same aircraft that includes the ADS-B transponder, wherein computing the taxability status of the aircraft is based upon the mismatch pertaining to the same aircraft that includes the ADS-B transponder.

15. A computer program product embodied in a non-transitory computer readable medium, the computer program product comprising instructions which cause one or more processors to perform operations of:
  obtaining traffic control system information for an aircraft from a first database, the traffic control system information indicative of departures and arrivals of the aircraft at a plurality of airports;
  detecting a gap in the traffic control system information for the aircraft during which a location of the aircraft is indeterminate from the traffic control system information alone, wherein detecting the gap is based upon a mismatch in the traffic control system information between a departure location of the aircraft and a preceding arrival location of the aircraft;
  receiving transponder data from a transponder that is mounted on board the aircraft by way of a transceiver positioned in proximity to an airport, the transponder data indicative of at least one of an altitude or a speed of the aircraft;
  determining, based upon the at least one of the altitude or the speed of the aircraft indicated in the transponder data, that the aircraft landed at the airport during a time for which the location of the aircraft was indeterminate; and
  outputting an indication that a tax may be due on the aircraft in a jurisdiction that includes the airport based upon determining that the aircraft landed at the airport during the time for which the location of the aircraft was indeterminate.

16. The computer program product of claim 15, wherein the traffic control system information is indicative of departures and arrivals for a plurality of aircraft that includes the aircraft, the traffic control system information for the plurality of aircraft indicates the departures and arrivals of the aircraft based upon a callsign of the aircraft, the operations further comprising:
  receiving second transponder data from the transponder that is mounted on board the aircraft, the second transponder data including a registration number of the aircraft
  determining that the callsign and the registration number are representative of the same aircraft based upon the second transponder data and the second traffic control system information, wherein determining that the aircraft was present at the airport at the time for which the location of the aircraft is indeterminate is based further upon the callsign and the registration number being determined to be representative of the same aircraft.

* * * * *